United States Patent [19]

Arzur et al.

[11] Patent Number: 4,970,073
[45] Date of Patent: Nov. 13, 1990

[54] ELECTRIC CELL STACK ASSEMBLY

[75] Inventors: Jean-Paul Arzur, Poitiers; Francois Joyeux, Chasseneuil du Poitou, both of France

[73] Assignee: Societe Anonyme Dite, France

[21] Appl. No.: 719,075

[22] Filed: Apr. 2, 1985

[30] Foreign Application Priority Data

Apr. 5, 1984 [FR] France ................ 84 05375

[51] Int. Cl.⁵ ............... H01M 6/46; H01M 6/42; H01M 2/08
[52] U.S. Cl. .................. 429/152; 429/153; 429/159; 429/174
[58] Field of Search ........ 429/152, 149, 153, 158–160, 429/156, 157, 174, 185

[56] References Cited

U.S. PATENT DOCUMENTS

| | | | |
|---|---|---|---|
| 2,886,623 | 5/1959 | Lehr | 136/173 |
| 3,347,709 | 10/1967 | Taylor et al. | 429/153 |
| 3,440,105 | 4/1969 | Yamamoto et al. | 429/153 |
| 3,597,276 | 8/1971 | Jammet | 429/153 X |
| 3,784,411 | 1/1974 | Ciliberti, Jr. | 429/157 |
| 3,784,411 | 1/1974 | Ciliberti, Jr. | 136/87 |
| 3,895,959 | 7/1975 | Dehmelt | 429/152 |
| 3,898,101 | 8/1975 | Bush et al. | 429/149 X |
| 3,986,894 | 10/1976 | Ciliberti, Jr. | 429/157 X |
| 3,986,894 | 10/1976 | Ciliberti, Jr. | 429/153 |
| 4,087,595 | 5/1978 | Mallery & Co. | 429/157 X |

FOREIGN PATENT DOCUMENTS 2488050 12/1983 France .

Primary Examiner—Stephen J. Kalafut

[57] ABSTRACT

In an electric cell stack assembly, each cell (1) in the top cell stage of the stack abuts against a holder member (7) in the very top stage of the stack having substantially the same mechanical characteristics, relative to a cell of the top cell stage, as has each cell relative to a cell of the next lower stage in the stack. Reinforcing members (8, 9) run along the entire length of the stack, including the said very top stage. The assembly is inserted in a tube and is encapsulated in a compound which preferably has a useful temperature range extending from −55° C. or less to +250° C. or more.

4 Claims, 3 Drawing Sheets

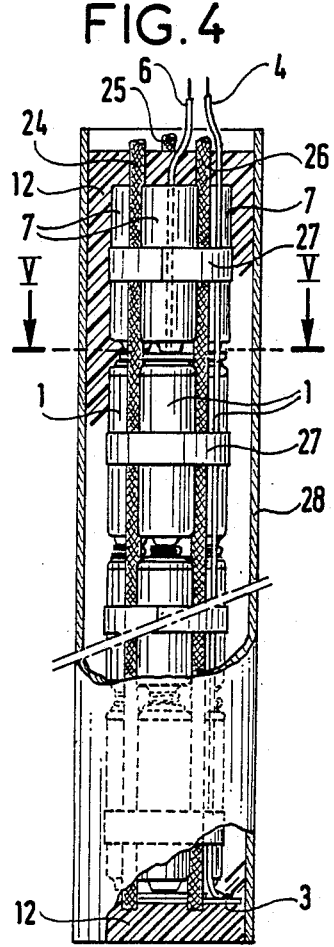
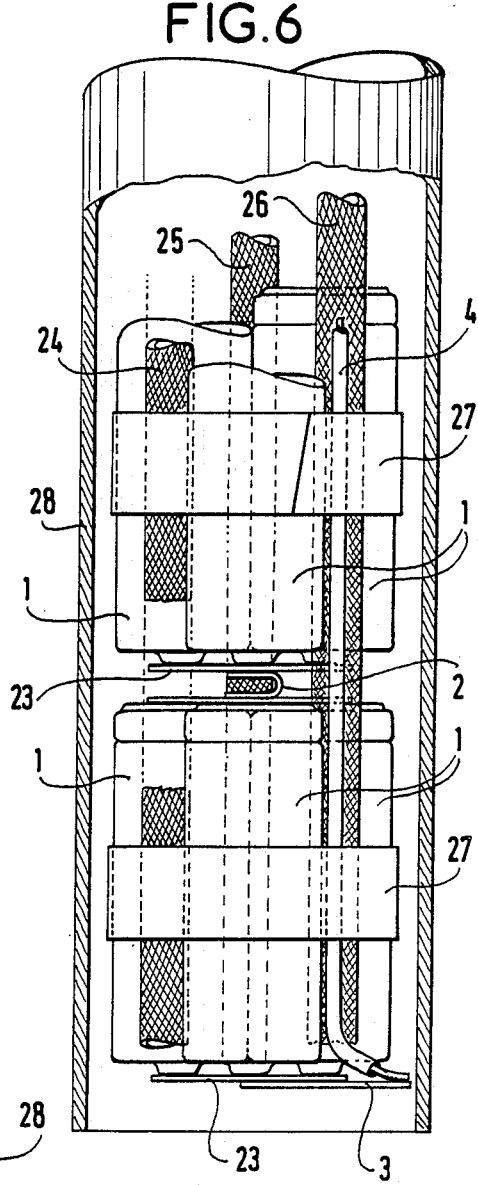
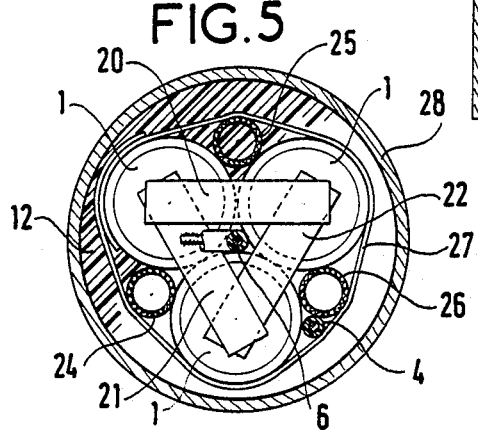
FIG.4
FIG.6
FIG.5

ELECTRIC CELL STACK ASSEMBLY

The present invention relates to an electric cell stack assembly, in which each electrically active stage of the stack includes at least one cell constituted by a cup which is closed by a cap and which includes a plastic seal between the cup and the cap.

BACKGROUND OF THE INVENTION

The operating temperature range of such stack assemblies is limited in practice to the operating range of the plastic seal. At low temperatures ($-20°$ C. and below) the seal becomes brittle or its thermal expansion characteristics cease to be adequately matched to those of the metal closure members, and at high temperatures ($+90°$ C. and above) the seal suffers from creep. In either case, the cells are no longer properly sealed, and their performance deteriorates or they cease functioning altogether.

In order to improve the mechanical strength of such stacks, a known practice consists in surrounding them over their entire length by reinforcing members, in inserting the resulting assembly into a tube (leaving two opposite polarity electrical terminals emerging therefrom), and in filling the voids in the tube with an encapsulating compound.

Unfortunately, it has been observed that regardless of the precautions taken during manufacture, there remain sealing problems with the cell or cells in the top stage of the stack.

Preferred embodiments of the present invention remedy this defect and considerably increase the range of temperatures over which the stack of cells may be used.

SUMMARY OF THE INVENTION

The present invention provides an electric cell stack assembly comprising:

a first plurality of electric cells, each constituted by an electric cell cup which is closed by a cap and which includes a plastic seal between said cup and said cap;

a stack comprising a second plurality of stack stages stacked on one another, with each stack stage including at least one electric cell cup or like member; opposite polarity electric terminals connected to said stack;

mechanical reinforcing members surrounding said stack over its entire length;

a tube in which said mechanically-reinforced stack is received, with said electric terminals extending outside said tube; and an encapsulating compound filling the voids in said tube with said mechanically-reinforced stack received therein;

said assembly including the improvement whereby stages in said stack including at least one electric cell are so disposed that each electric cell cap is located adjacent to an electric cell cup or like member in the adjacent stage of the stack, with the cap end stage of the stack being constituted by at least one holder member having the same mechanical characteristics relative to the adjacent cell cap as a cell cup, thereby ensuring substantially uniform mechanical conditions in the vicinity of each of said plastic seals in the completed electric cell stack assembly.

Advantageously, each holder member is constituted by a cup suitable for use as an electric cell cup in the manufacture of said electric cells.

BRIEF DESCRIPTION OF THE DRAWINGS

Embodiments of the invention are described by way of example, with reference to the accompanying drawings, in which:

FIG. 4 is an elevation view in partial section of a second battery assembly in accordance with the invention and including three cells per stage;

FIG. 5 is a view of the FIG. 4 assembly seen from above and in section on a line V—V;

FIG. 6 is an elevation view in partial section of a portion of the FIG. 4 assembly shown to a larger scale;

MORE DETAILED DESCRIPTION

Figure 1:
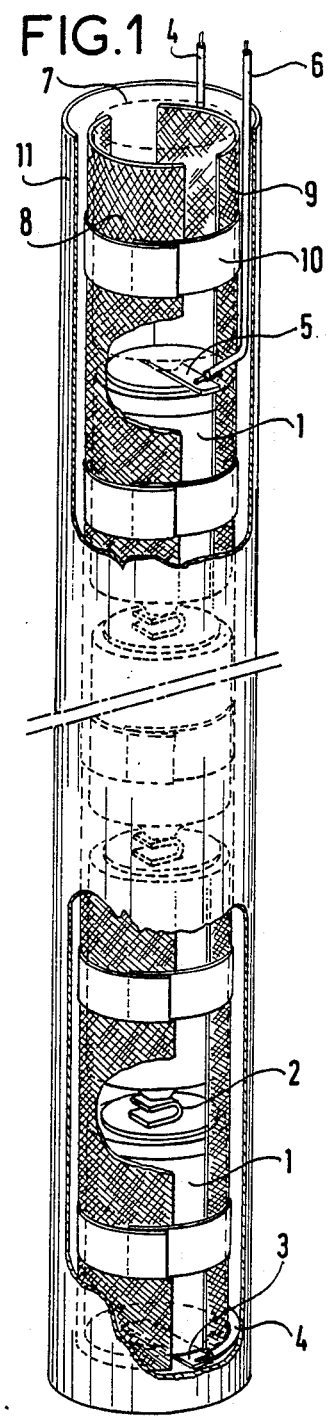
FIG. 1 is an elevation view in partial section of a first battery assembly in accordance with the invention.
Figure 2:
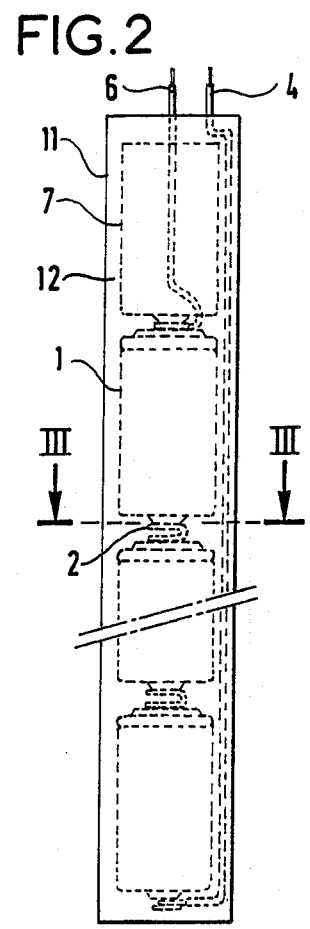
FIG. 2 is a simplified elevation view of the assembly shown in FIG. 1.
Figure 3:
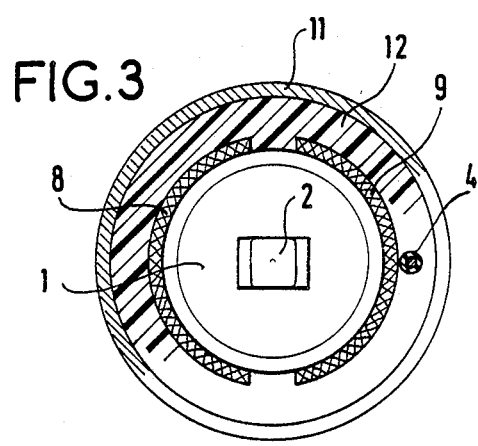
FIG. 3 is a view of the FIG. 2 assembly seen from above and in section on a line III—III.

FIGS. 1, 2, and 3 show a cell assembly constituted by a conventional stack of cells 1 such as lithium cells, for example. The cells are closed by crimped plastic seals and they are interconnected by means of C-shaped contact parts 2. At the bottom of the stack of batteries there is a contact blade 3 which is connected to a wire 4, and at the top of the stack there is a contact blade 5 connected to a wire 6. The cells are connected in series by means of the contact parts 2, and the wires 4 and 6 are thus connected to the positive and negative terminals of the battery as a whole. In accordance with the invention, the top cell of the stack has a holder part 7 thereabove, and two glass fiber reinforcing members 8 and 9 which are disposed against the full height of the cells 1 and the holder part 7. The reinforcing members may be glass fiber tapes held in place by binding tapes 10 which confer a degree of rigidity to the stack and thus facilitate its manipulation and its insertion into a tube 11 which may be made of metal or of epoxy. The binding tapes may be adhesive tapes, for example. After being assembled into the tube, the tube is filled with a thermosetting encapsulating compound 12 which thus completely covers the stack of cells 1, the holder part 7, and the reinforcing members 8 and 9.

FIG. 1 is an elevation view in partial section of the stack in the tube 11 prior to encapsulation. FIG. 2 is a diagrammatic elevation view of the FIG. 1 assembly after encapsulation, and FIG. 3 is a view looking down of a section on a line III—III in FIG. 2. The compound 12 is shown in FIGS. 2 and 3.

In their stack, the cells are subjected to temperature variations which can give rise to stresses due to thermal expansion, and also to the effects of internal pressure generated by the rise in internal cell temperature. In an assembly in accordance with the invention, the top cell has the holder part 7 opposite to its cover, and each of the other cells of the stack has the metal bottom of an adjacent cell cup opposite to its cover, which contributes to all of the cells being consolidated to the same degree to the encapsulation in the vicinity of their closures. The holder part 7 is of similar shape to a cell, and it is made of a material which is compatible with the encapsulating compound and with the various external stresses. The holder part 7 may simply be constituted by an empty cell can, which is subsequently filled with compound during encapsulation.

The compound encapsulates the cells completely and thus keeps them sealed, even when their normal operating temperature range is exceeded, which temperature range is determined by the behavior of the plastic seals which close the cells. Naturally the encapsulating compound must have excellent properties over a temperature range including the temperature range of the plastic seals. A suitable encapsulating compound is of the epoxy or polyurethane type with silica embedded therein, and with a usable temperature range of $-55°$ C. to $+250°$ C.

The compound must also have good adherence and good fluid flow properties before it sets in order to improve cell sealing and to be able to keep them sealed at temperatures at which the seal in each cell is incapable of providing adequate sealing.

Encapsulating compounds currently in use are mechanically weak. Since the stresses generated due the effects of temperature related expansion and pressure act mainly along the axial direction of the cells and thus of the stack, the compound may crack and cease to provide sealing. To mitigate this defect, axially directed glass fiber reinforcing members are associated with the encapsulating compound and extend over the entire length of the stack constituted by the cells 1 and the holder part 7.

FIGS. 1, 2, and 3 relate to a stack of cells in which each stage is constituted by a single cell. When increased power is to be delivered by the set of cells, it is well known to connect a plurality of cells in parallel at each stage, i.e. to have each stage constituted by a battery of cells.

FIGS. 4, 5, and 6 relate to a stack of batteries of lithium cells, with each battery being constituted by three lithium cells connected in parallel. FIG. 4 is an elevation view of a stack in partial section and with the encapsulating compound being shown only at the top and bottom ends of the stack in order to clarify the figure. FIG. 6 is an elevation view of the bottom of the stack shown in FIG. 4 prior to encapsulation and with the tube being cut away. FIG. 5 is view looking down on a section V—V in FIG. 4. In each stage of the battery, the negative terminals of the three cells 1 are interconnected by junction blades 20, 21, and 22 (see FIG. 5), and the positive terminals of the three cells are likewise interconnected by junction blades such as the blade 23 which is visible in FIG. 6. Two successive batteries of cells are interconnected by a C-shaped contact part 2 (see FIG. 6). The top battery of cells in the stack has a set of three holder parts 7 placed thereabove. Three glass fiber reinforcing members 24, 25, and 26 run along the entire length of the stack, being disposed against the cells 1 and the holder parts 7 at each stage by binding tapes 27. The reinforcing members 24, 25, 26 may be in the form of fiber glass sheaths. As in the previous example described with reference to FIGS. 1, 2, and 3, the binding tapes confer a degree of rigidity to the stack, thus facilitating handling, and in particular insertion of the stack into the metal or epoxy tube 28. Once the stack has been inserted in the tube, it is encapsulated in compound.

Figure 7:
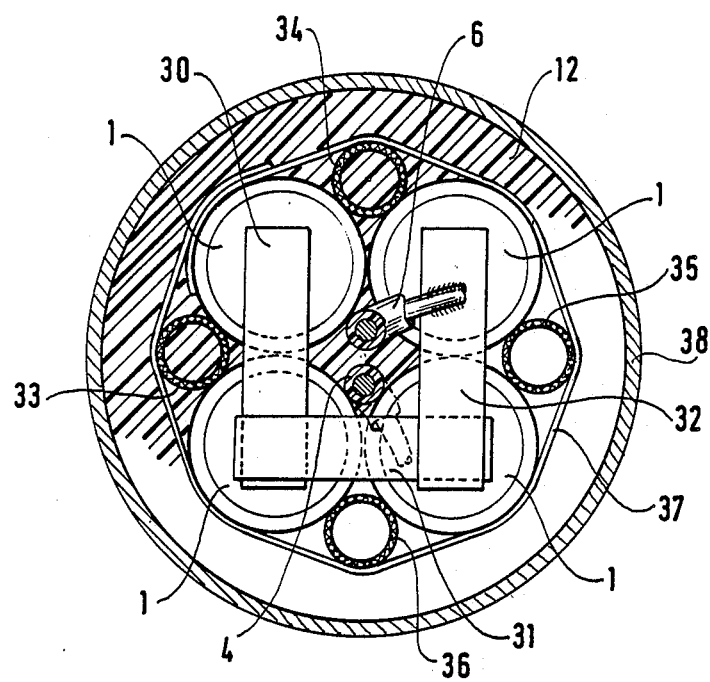
FIG. 7 is a view from above showing a four cell stage in an assembly in accordance with the invention.

FIG. 7 is a section through a stack made up from batteries of four lithium cells each. The section is between the top battery of the stack and the set of holder parts thereabove. This figure is thus comparable to FIG. 5. Each battery of cells is constituted by four cells 1 connected in parallel, with the negative terminals being interconnected by junction blades 30, 31, and 32. The positive terminals are likewise interconnected. The wire 4 is connected to the positive terminal of the stack of batteries and the wire 6 is connected to the negative terminal of the stack, i.e. to the negative terminal of the battery shown in FIG. 7. Four glass fiber sheaths 33, 34, 35, 36 run along the entire height of the stack, including the set of four holder parts, and they are held fast to each stage by adhesive binder tapes 37 which also serve to hold the four cells of each stage together. The assembly is contained in a tube 38 and is encapsulated in compound 12 which is shown only in part of FIG. 7 for the sake of clarity.

Naturally, the number of cells making up a single stage battery in the stack is not limited to four or less: higher numbers may be used, and the same number of holder parts should then be used in the top stage. There may also be more than four longitudinal reinforcing members.

We claim:

1. An electric cell stack assembly comprising:
   a plurality of stack stages stacked on one another, with each stack stage including at least one electric cell; and each cell having an electric cell cup, a cap closing the electric cell cup, and a plastic seal between said electric cell cup and said cap, the stack stages being disposed such that an electric cell cup in one stage is located adjacent to a cap of an electric cell in an adjacent stack stage, such that the stack has a cup end and a cap end;
   opposite polarity electric terminals connected respectively to the cup end and the cap end of said stack;
   mechanical reinforcing members applied longitudinally to said stack;
   a tube in which said mechanically reinforced stack is received, with said electric terminals extending outside said tube; and
   an encapsulating compound filling said tube with said mechanically reinforced stack received therein;
   wherein the improvement comprises a non-electric cell stage disposed at the cap end of the stack, the non-electric cell stage comprising at least one holder member having the same mechanical characteristics relative to the cap of the adjacent electric cell as an electric cell cup, and the mechanical reinforcing members being applied over the entire length of the stack and the non-electric cell stage, thereby ensuring substantially uniform mechanical conditions in the vicinity of each of said plastic seals in the completed electric cell stack assembly.

2. An assembly according to claim 1, wherein each holder member comprises a cup suitable for use as an electric cell cup in the manufacture of said electric cells.

3. An assembly according to claim 1, wherein the reinforcing members comprise fiber glass sheaths, with said fibers being oriented parallel to the stacking direction of said stack.

4. An assembly according to claim 1, wherein said encapsulating compound is usable over a temperature range including at least $-55°$ C. to $+250°$ C.

* * * * *

UNITED STATES PATENT AND TRADEMARK OFFICE
CERTIFICATE OF CORRECTION

PATENT NO. : 4,970,073

DATED : 13 November 1990

INVENTOR(S) : Jean-Paul ARZUR et al.

It is certified that error appears in the above-identified patent and that said Letters Patent is hereby corrected as shown below:

Title Page, item [73]:  after "Dite" insert -- :SAFT, Romainville--.

Signed and Sealed this

Ninth Day of March, 1993

Attest:

STEPHEN G. KUNIN

*Attesting Officer*   Acting Commissioner of Patents and Trademarks